June 10, 1969
W. SCHINDLER
3,448,878
LOW BED TRAILER
Filed July 24, 1967
Sheet 1 of 4
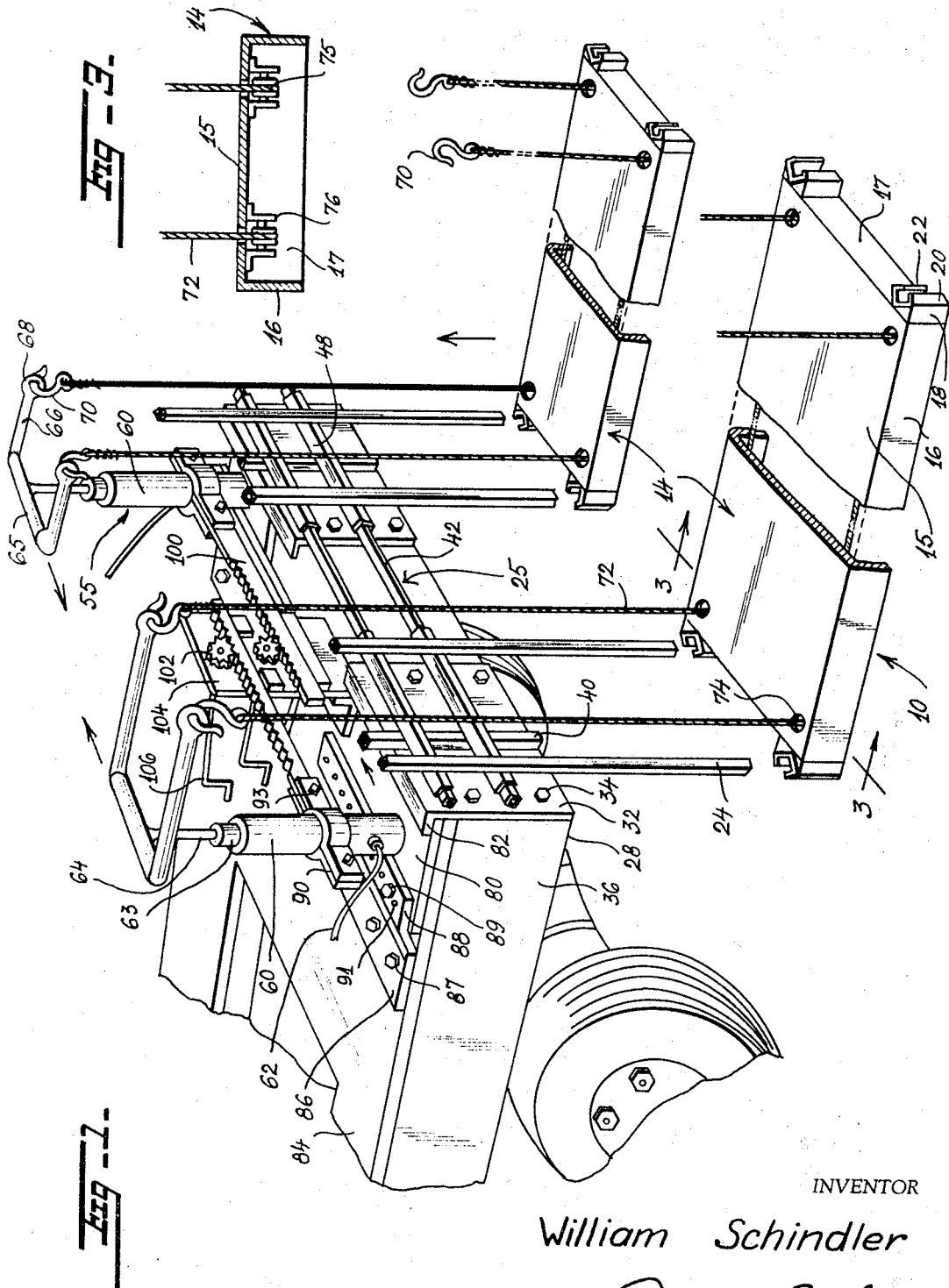
INVENTOR
William Schindler
BY Polachek & Saulsbury
ATTORNEYS June 10, 1969
W. SCHINDLER
3,448,878
LCW BED TRAILER
Filed July 24, 1967
Sheet 2 of 4
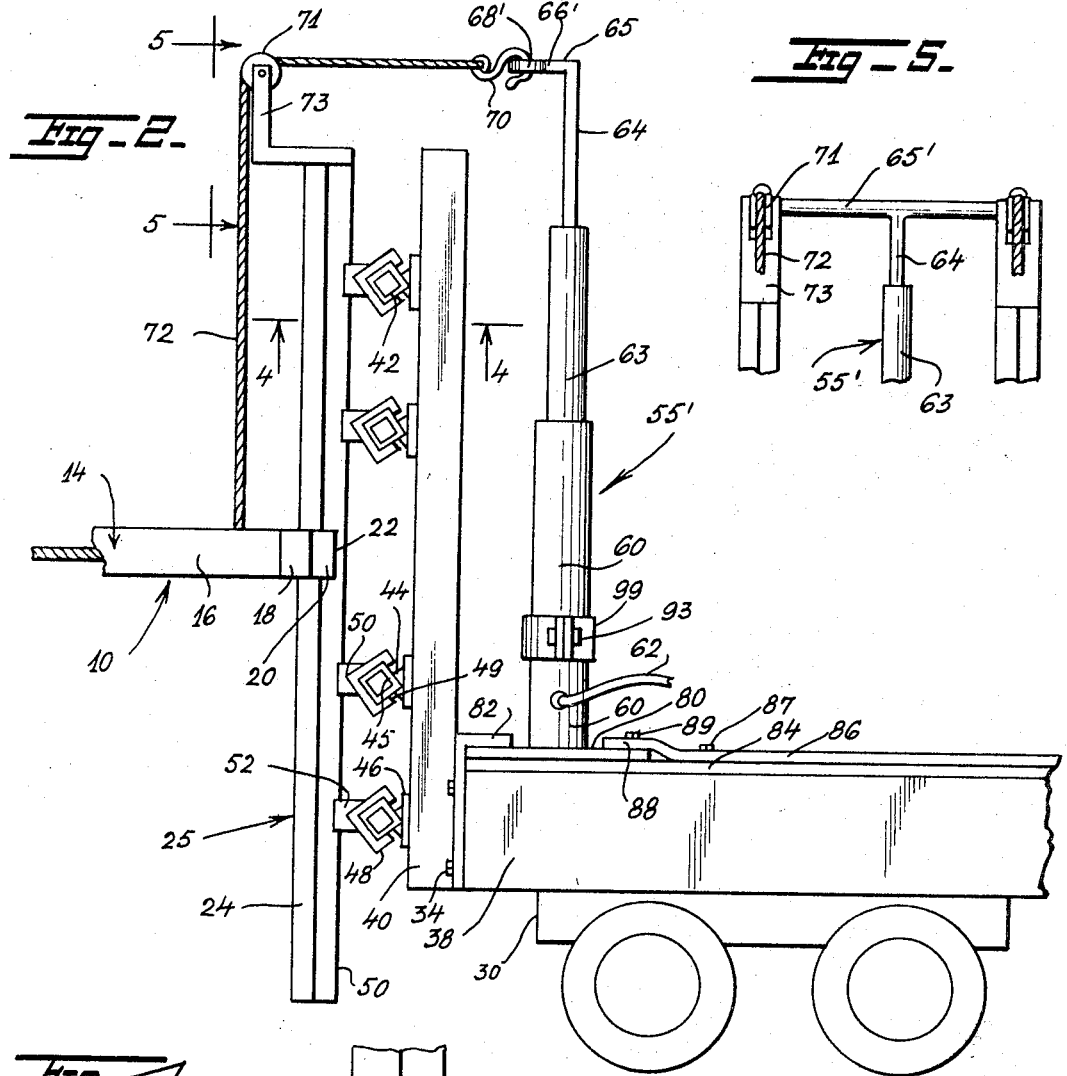
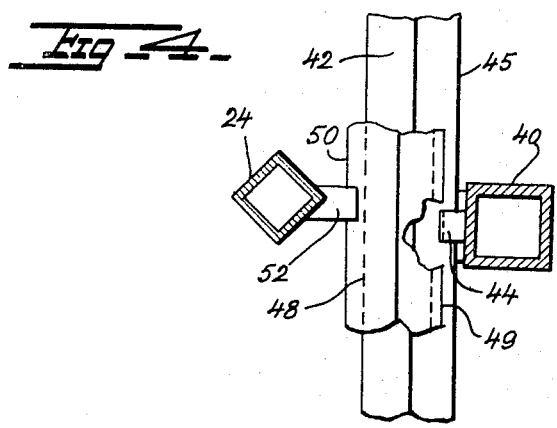
INVENTOR
William Schindler
BY Polachek & Saulsbury
ATTORNEYS June 10, 1969   W. SCHINDLER   3,448,878
LOW BED TRAILER
Filed July 24, 1967   Sheet 3 of 4
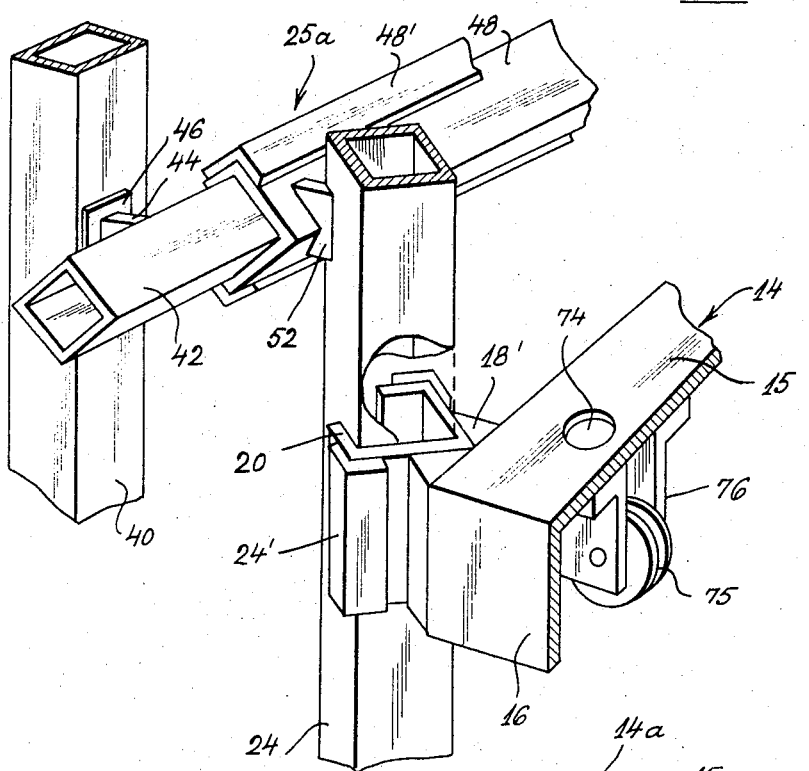
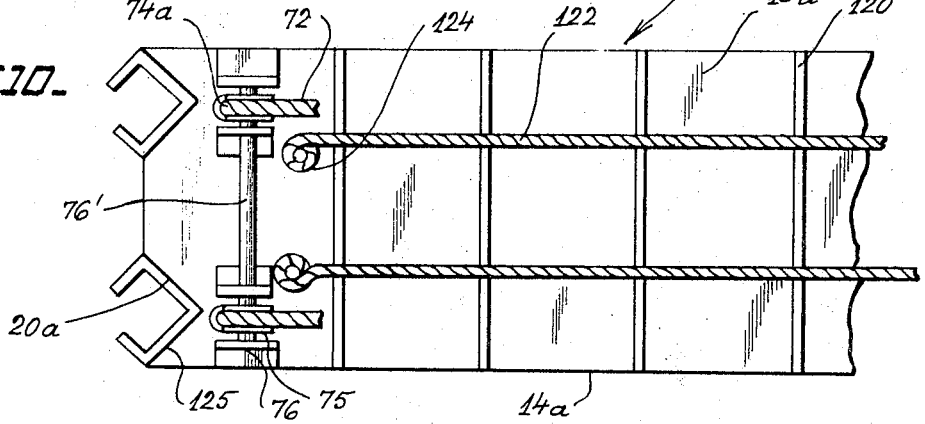
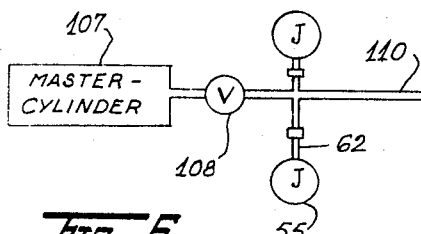
INVENTOR
William Schindler
BY Polachek & Saulsbury
ATTORNEYS

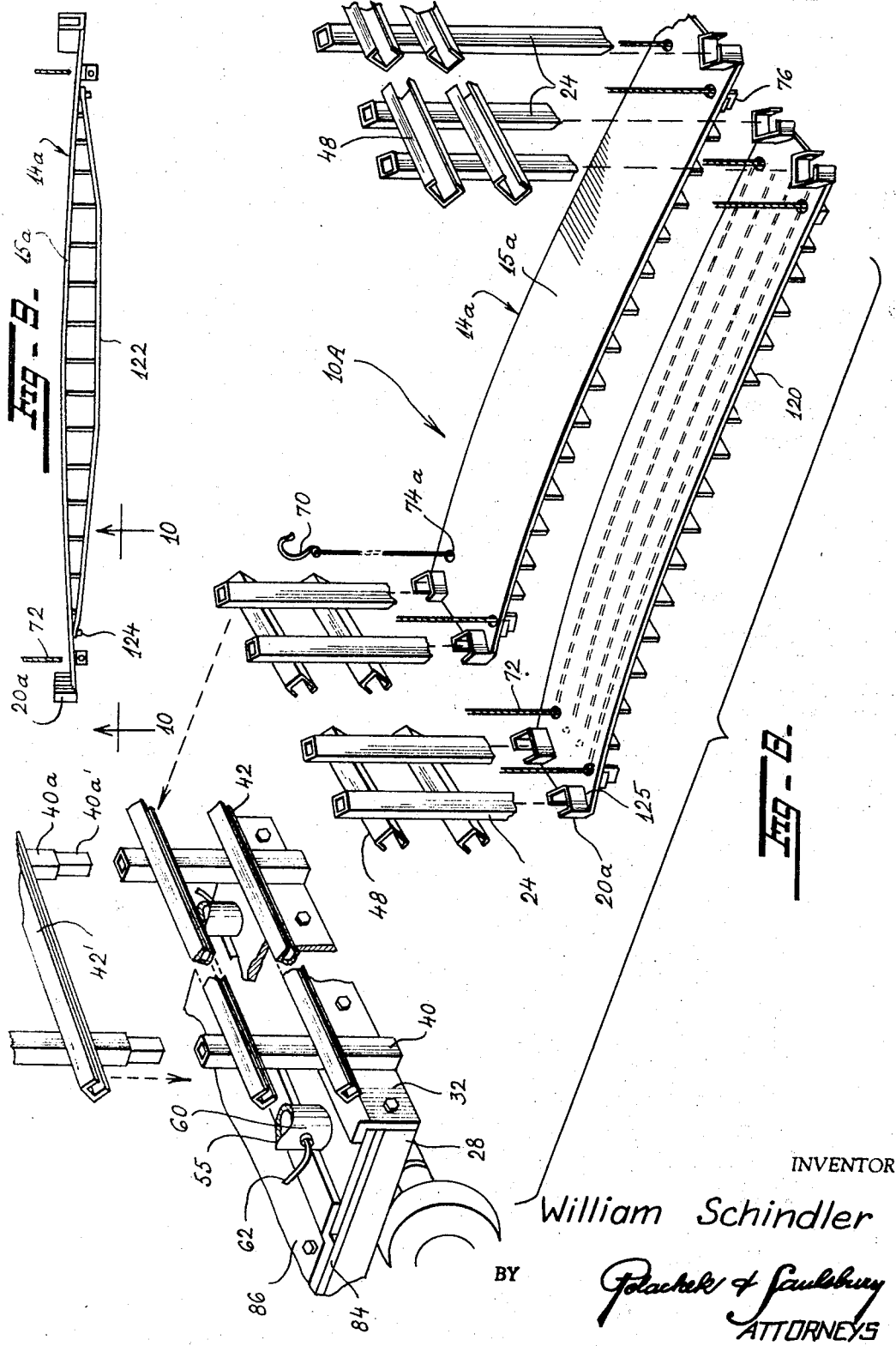

United States Patent Office

3,448,878
Patented June 10, 1969

---

3,448,878
LOW BED TRAILER
William Schindler, 135 Kohl St.,
Creve Coeur, Ill. 61611
Filed July 24, 1967, Ser. No. 655,648
Int. Cl. B60p *1/02;* B62d *53/06;* B66b *9/20*
U.S. Cl. 214—512                7 Claims

ABSTRACT OF THE DISCLOSURE

The disclosure describes a trailer bed which can be lowered down to the ground for unloading heavy equipment and which can be elevated in transit while loaded or unloaded. The trailer bed has a pair of horizontally spaced beams which can be adjusted in spacing. Hydraulic jacks at each corner of the trailer bed lift the trailer bed on cables. A framework of rails is provided for guiding and supporting ends of the beams in horizontal and vertical movements. The rails are made of square tubing. The trailer bed is so arranged that it can be quickly and completely detached from the supporting framework and hydraulic jacks.

---

The invention relates to the art of low bed trailers of the type adapted for use in hauling machine, road surfacing equipment and the like.

Trailers of low bed type may be as much as forty feet long and eight feet wide. Heretofore they have been fabricated as massive steel frameworks. The trailer bed described in U.S. Patent 2,889,060 is typical of such trailers. They are fixed in length and width, permanently secured to supporting trucks or bogies at opposite ends, and generally not adjustable in height.

The present invention has a principal object to provide a low bed trailer which is made of relatively light beams.

Another object is to provide a framework construction for supporting ends of a trailer bed so that the trailer bed can be raised and lowered freely and sections of the trailer bed can be spaced apart adjustably.

Still another object is to provide a trailer bed which is raised and lowered by hydraulic jacks and which can be lowered to the ground.

Another object is to provide a trailer bed which can be quickly detached from supporting jacks for loading and unloading heavy equipment.

A further object is to provide a trailer bed construction in which hydraulic jacks supporting sections of the trailer bed are movably and adjustably spaced apart for adjusting the spacing of the trailer bed sections.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view with parts broken away of a trailer bed with a framework and truck for supporting one end of the trailer bed, the trailer bed being shown in fully lowered position.

FIG. 2 is a side view of part of a truck shown supporting the other end of the trailer bed.

FIG. 3 is a cross sectional taken on line 3—3 of FIG. 1 through part of the trailer bed.

FIG. 4 is an enlarged horizontal sectional view taken on line 4—4 of FIG. 2.

FIG. 5 is a fragmentary front view taken on line 5—5 of FIG. 2.

FIG. 6 is a diagram of a hydraulic system for operating lifting jacks.

FIG. 7 is an enlarged perspective view of parts of a trailer bed and supporting framework illustrating a modification of the invention.

FIG. 8 is an exploded perspective view of parts of another trailer bed, a supporting truck and framework.

FIG. 9 is a side view of one of the beams employed in the trailer bed of FIG. 8.

FIG. 10 is a fragmentary enlarged bottom plan view taken on line 10—10 of FIG. 9.

Referring first to FIGS. 1–5, there is shown a trailer bed 10 having two identical individual sections 12. Each section includes a horizontal channel beam 14 having a rectangular top panel 15, side walls 16, and a cross wall 17 at each end. Attached to ends of the cross walls at the four corners of the beam are blocks 18 to which are welded short axially vertical channel guides or sleeves 20. The sleeves 20 are rectangular in cross section and have open outer end corners 22. These sleeves slide vertically on vertical rails 24 forming part of supporting framework 25 at opposite ends of the trailer bed.

One framework 25 is supported on a front truck or tractor 28 shown in FIG. 1 and the other framework is supported on a rear truck or trailer 30 shown in FIG. 2. The frameworks are substantially the same in construction. Corresponding parts are identically numbered. Two horizontally spaced coplanar vertical plates 32 serve as supports for the framework. The plates can be secured by bolts 34 to one end of truck body 36 or 38. Two vertical horizontally spaced rectangular posts 40 are welded to the plates 32. Welded to posts 40 are two or more horizontal rails 42. Each rail is tubular in form and rectangular in cross section. The rails are positioned so that each side thereof is disposed 45° to the adjacent faces of posts 40. Webs 44 shown in FIGS. 2 and 4 can connect horizontal corners 45 of the rails to butt plates 46 on the posts. Slidably mounted on the rails are channel shaped sleeves 48. These sleeves are rectangular in cross section and open at their outer corners 49 so that sleeves clear the webs 44 when sliding on the horizontal rails. Vertical rails 24 are secured to the sleeves 48. The rails 24 can be joined by webs 52 adjacent corners 50 of sleeves 48. The open corners 22 are provided in sleeves 20 of the trailer bed for clearing the webs 52, when the sections of the trailer bed are raised and lowered.

In order to raise and lower the trailer bed, there are provided two pairs of hydraulic jacks 55, 55′, with one pair on each of the trucks 28 and 30. As shown in FIGS. 1 and 2, each jack has an axially vertical base cylinder 60 which receives fluid via a conduit 62. An inner jack tube 63 is slidably mounted in cylinder 60 and an axial plunger 64 is axially slidable in tube 63. A horizontal U-shaped bar 65 or 65′ extends outwardly of the upper end of plunger 64. The arms 66 and 66′ of the bars terminate in eyes 68 or 68′. Hooks 70 can be detachably engaged in eyes 68 or 68′. Attached to the hooks are opposite ends of cables 72. Each section 12 of the trailer bed is provided with two supporting cables 72. The cables extend downwardly from the arms 66 of the jacks 55 and through holes 74 formed near ends of top panel 15. Cables 72 are entrained over pulleys 71 carried by L-shaped brackets 73 mounted at upper ends of rails 24 at the truck 30. This construction is employed when the jacks 55′ are provided with arms 66′ which are shorter than arms 66 of jacks 55.

In FIGS. 3 and 7, pulleys 75 are shown rotatably carried by L-shaped brackets 76 mounted at the underside of panel 15 close to holes 74. The cables 72 are entrained under the pulleys. The two cables thus extend underneath each trailer bed section from end to end thereof near to and just within side walls 16. It will be apparent that when the sleeves 20 of the trailer sections are engaged on respective vertical rails 24, the cables 72 can raise and lower the trailer sections as the jacks are selectively extended and contracted.

The trailed bed sections can be lowered to the ground and then hooks 70 can be disengaged from the arms of the jacks for clearing one or both ends of the trailer bed sections. Heavy machinery or road surfacing equipment can be loaded on the trailer bed from either end. After loading the hooks 70 can be engaged in eyes 68 and the loaded trailer bed can be elevated to any desired height. While the loaded trailer bed is in transit, the bed can be raised further if desired to clear some roadway obstruction or the bed can be lowered to clear some overhead obstruction.

The assembly is arranged so that the spacing between the trailer bed sections 12 can be changed if desired. For example if the trailer bed is eight feet wide, with each section one foot wide, there will be six feet clearance between the sections. This can be reduced to four feet or less between sections. In order to adjust this spacing, the jacks 55 are mounted on rectangular plates 80. Outer edges of the plates are engaged under horizontal flanges 82 formed at the upper ends of plates 32. The flanges 82 overlay horizontal plates 84 secured to the tops of the trucks. Plates 86 are secured to plates 84 by bolts 87. Plates 86 have flanges 88 overlaying the other edges of plates 80. The plates 80 are thus slidable under flanges 82, 88. Pins 89 can be inserted in holes 91 of flanges and plates 80 to hold the plates 80 in place. Clamp bars 90 are secured by bolts 93 to base cylinders 60. These clamp bars support rack gears 100 engaged with spur gears 102 rotatably mounted on a vertical stationary plate 104. Cranks 106 can be turned manually to rotate gears 102 for moving the rack gears individually. The rack gears will in turn move the jacks laterally. By this arrangement the jacks can be adjusted in position. The vertical rails 24 are manually movable along horizontal rails 42. The beams 14 are movable vertically when engaged with rails 24 Thus the horizontal spacing and vertical positions of the beams are readily adjustable.

In order to raise and lower the jack arm 66 and 66' the hydraulic system shown in FIG. 6 can be employed. A cylinder 10 containing fluid under pressure drives the fluid via a valve 108, manifold 110, and conduits 62 to each of jacks 55 anl 55' for simultaneously elevating the plungers and arms of the jacks. When the valve is closed, the jacks will remain elevated. When the valve is open and pressure is relieved in cylinder 107 the jacks will retract under the weight of the jack arms to lower the elevated beams.

In FIG. 7 is shown framework 25a which is similar to framework 25 and corresponding parts are identically numbered. In this framework lateral corners of sleeves 20 are reinforced by angle bars or plates 20'. The blocks 18' are shaped so as to leave allowable room for attachment of the angle bars. Similar angle bars 48' are provided at opposite upper and lower corners of sleeves 48'.

In FIGS. 8–10 is shown another trailer bed 10A in which beams 14a are formed as long rectangular plates or panels 15a. Underneath the panels are transverse, vertical reinforcement plates 120. A pair of cables 122 are secured at opposite ends to pins 124 near opposite ends of each panel. This forms a strong, lightweight, flexible beam structure in which the cables 122 are tensioned when a load is placed on the panels. Plates 120 near the ends of the panels can be narrower than plates at the center. Corner cutouts 125 are formed in the panels. In these cutouts are welded sleeves 20a which engage slidably on vertical rails 24 shown in FIG. 8. Cables 72 extend through holes 74a near ends of the panels and underneath the panels for supporting the beams 14a in the same manner as described in connection with beams 14. The cables terminate in hooks 70. Other parts of the framework 25, laterally movable jacks and associated parts shown in FIG. 8, correspond to similar parts shown in FIG. 1 and are identically numbered. If desired posts 40 can be provided with removable extensions 40a carrying further rails 42'. Tenons 40a' of posts 40a fit into tops of posts 40. Sleeves 48 can be engaged on rails 42 or 42' or both. Shaft 76' exends through brackets 76 and supports pulleys 75 under which cables 72 are entrained.

The beams 14 and 14a are movable vertically simultaneously and are laterally adjustable. This arrangement imparts a degree of versatility and flexibility not heretofore provided by conventional low bed trailers. The beams and frameworks can be made up in various sizes and arrangements. Various types of jacks can be employed.

What is claimed is:

1. A trailer bed assembly comprising a pair of vertically movable horizontally spaced horizontal beams, axially vertical sleeves at ends of the beams, a framework supported on a truck, said framework comprising vertical rails, said sleeves being slidably engageable with said rails, and movable up and down the rails, means for supporting the beams while engaged with the rails, and means for raising and lowering the beams simultaneously while said sleeves are both in and out of engagement with said rails, said framework further comprising stationary support means, posts secured vertically to said support means, horizontal rails secured to said posts, and axially horizontal sleeves movable along said horizontal rails, said vertical rails being attached to the horizontal sleeves so that the beams when engaged with the vertical rails are movable laterally with respect to each other when the horizontal sleeves are moved on the horizontal rails.

2. A trailer bed assembly as recited in claim 1, wherein said means for supporting the beams comprises cables extending horizontally underneath the beams and vertically upwardly at opposite ends of the means, and wherein said means for raising and lowering the beams comprises jacks at opposite ends of the beams engageable with said cables.

3. A trailer bed assembly as recited in claim 2, further comprising means detachably engaging ends of the cables with said jacks so that the cables can be detached from the jacks, and so that the beams can be lowered to the ground and detached from the framework for loading the beams while the beams rest on the ground.

4. A trailer bed assembly as recited in claim 1, further comprising webs connecting the horizontal rails to the posts and connecting the vertical rails to the horizontal sleeves, said horizontal and vertical sleeves having open corners for clearing the webs when the horizontal sleeves move past the posts and when the vertical sleeves move past the horizontal sleeves.

5. A trailer bed assembly as recited in claim 1, wherein each of said beams comprises a horizontal flexible panel, vertical reinforcement plates extending transversely under said panel, and a plurality of tensioning cables secured at opposite ends near opposite ends of said panel and extending under the reinforcement plates.

6. A trailer bed assembly as recited in claim 2, further comprising laterally movable horizontal supports opposite ends of the beams, and mechanical means engaged with said horizontal supports for moving the same laterally toward and away from each other, said jacks being mounted on said supports respectively so that the beams can be adjustably spaced horizontally with respect to each other when the jacks are adjustably spaced from each other by operation of said mechanical means.

7. A trailer bed assembly as recited in claim 2, wherein each of said jacks has a pair of horizontal arms at uppermost ends thereof, each of said arms having an eye formed at its free end and hooks attached to ends of said cables and detachably engaged in the eyes respectively, so that the cables can be quickly detached from the jacks and so that the beams can be lowered to the ground and detached from the framework for loading the beams while the beams rest on the ground.

References Cited

UNITED STATES PATENTS

| 2,816,675 | 12/1957 | Baker | 214—390 |
|---|---|---|---|
| 3,146,903 | 9/1964 | Bjorklund | 214—394 |
| 3,199,696 | 8/1965 | Chrysler et al. | 214—512 |
| 3,236,331 | 2/1966 | Green | 182—144 |

ABERT J. MAKAY, *Primary Examiner.*

U.S. Cl. X.R.

187—9; 280—423